Patented Nov. 16, 1926.

1,607,474

UNITED STATES PATENT OFFICE.

HARRY S. MORK, OF BROOKLINE, MASSACHUSETTS, ASSIGNOR, BY MESNE ASSIGNMENTS, TO LUSTRON COMPANY INC., OF BOSTON, MASSACHUSETTS, A CORPORATION OF MASSACHUSETTS.

STABILIZED CELLULOSE ESTER AND PROCESS OF PREPARING SAME.

No Drawing.    Application filed March 12, 1921.   Serial No. 451,845.

This invention comprises a process of stabilizing organic cellulose esters, such for example as cellulose acetate, and the stabilized products thereby prepared. The specific advantage of stabilization in accordance with the invention is that a practically permanent stability is thereby conferred upon the cellulose ester product, even though the stabilizing agent may be wholly or in part removed in later manipulations, as will hereinafter be explained.

My stabilizing process is particularly applicable to and useful in the manufacture of cellulose acetate artificial silk. Various stabilizing agents have been suggested for use in connection with cellulose acetate, such for example as urea, substituted ureas, alkaloids, etc. Such organic nitrogen compounds are in a measure effective so long as they remain incorporated with the cellulose acetate product. They are, however, liable to be removed during the scouring and dyeing operations in alkaline, neutral or acid baths to which cellulose acetate silk is commonly subjected in textile finishing processes; and after such removal it is found that the silk will not be appreciably more stable than it was originally, so that if subsequently subjected to a moderately hot iron it will have a tendency to carbonize.

I have found that lasting stability may be conferred upon the ester and ester products by incorporating therewith, at a suitable manufacturing stage, a very small proportion of an organic acid salt of an alkali metal. Inasmuch as sulfuric acid is the ordinary condensing agent employed in the preparation of cellulose acetate, the observed instability of the acetate and acetate products is perhaps attributable to very small sulfuric acid residues existing either in the free state or combined as aceto-sulfates; and it may be assumed, without thereby limiting my invention, that the action of the organic salt addition is to neutralize such residues in an effective and permanent manner. Salts which have proven to be effective stabilizers are sodium and potassium acetates, sodium and potassium oleates, sodium salicylate, sodium benzoate and the like.

I prefer to select a salt which is soluble in a solvent which is miscible with the gelatinized or dissolved cellulose acetate: For example, if the cellulose acetate is dissolved in a mixture of tetrachlorethane and ethyl alcohol, the stabilizer selected is preferably one which is soluble in alcohol or in tetrachlorethane or in a mixture of these solvents. The cellulose acetate solution and the stabilizer solution can then be mixed to a homogeneous system. The stabilizer should also be one which when mixed under the above conditions, and in the small percentages required, will not bring about any permanent coagulation of the cellulose acetate or formation of a precipitate in the solution.

Very effective stabilizers are the potash soaps of vegetable oil fatty acids. The proportion of anhydrous soap required for effective stabilization is very small, and probably need in no case exceed 2% by weight of the ester; and the proportion may be as low as 0.5%. The proportion to be used cannot be more definitely stated for the reason that the amount of stabilizer required will vary according to the conditions of manufacture of the cellulose ester.

Instead of adding the stabilizer to the gelatinized cellulose acetate, it may be incorporated with the cellulose acetate before the latter is dissolved or gelatinized.

I claim:

1. Process of stabilizing cellulose acetate consisting in incorporating therewith about 2 per cent of an organic acid salt of an alkali metal.

2. Process according to claim 1 in which the stabilizing salt is dissolved in a solvent miscible with the cellulose acetate solution.

3. As a new composition of matter, cellulose acetate having intimately incorporated therewith about 2 per cent of an organic acid salt of an alkali metal effective as a stabilizer for said cellulose acetate.

4. Process of stabilizing cellulose acetate which comprises mixing not more than about 2 per cent of an organic compound of an alkali metal with a solution of the cellulose acetate in an organic solvent.

5. Process of stabilizing cellulose acetate which comprises incorporating therewith an alkali metal salt of an organic acid, said organic acid being practically insoluble in water in quantity sufficient to neutralize the acid residues in the ester.

In testimony whereof, I affix my signature.

HARRY S. MORK.